US006655592B2

(12) United States Patent
Shaked et al.

(10) Patent No.: US 6,655,592 B2
(45) Date of Patent: Dec. 2, 2003

(54) GRAPHICALLY DEMODULATING GRAPHICAL BAR CODES WITHOUT FOREKNOWLEDGE OF THE ORIGINAL UNMODULATED BASE IMAGE

(75) Inventors: Doron Shaked, Sunnyvale, CA (US); Avi Levy, Tivon (IL); Jonathan Yen, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/975,278

(22) Filed: Oct. 10, 2001

(65) Prior Publication Data
US 2003/0066890 A1 Apr. 10, 2003

(51) Int. Cl.[7] .................................................. G06K 7/10
(52) U.S. Cl. .................................. 235/462.01; 235/494
(58) Field of Search ........................... 235/462.01, 494, 235/456, 495, 469; 382/248, 166, 232

(56) References Cited

U.S. PATENT DOCUMENTS

| 5,367,578 A | | 11/1994 | Golem et al. |
|---|---|---|---|
| 5,818,970 A | | 10/1998 | Ishikawa et al. |
| 6,032,861 A | * | 3/2000 | Lemelson et al. ........... 235/456 |
| 6,141,441 A | | 10/2000 | Cass et al. |
| 6,240,212 B1 | * | 5/2001 | Son et al. .................... 382/243 |
| 6,373,587 B1 | * | 4/2002 | Sansone ..................... 358/1.15 |
| 6,398,117 B1 | * | 6/2002 | Oakeson et al. ............ 235/494 |
| 6,427,922 B1 | * | 8/2002 | Marchand ................... 235/494 |

FOREIGN PATENT DOCUMENTS

| JP | 08235302 | 9/1996 |
|---|---|---|
| WO | WO95/34043 | 12/1995 |

* cited by examiner

Primary Examiner—Karl D. Frech
Assistant Examiner—Steven S. Paik (57) ABSTRACT

Systems and methods of graphically demodulating a graphical bar code (i.e., an image that contains inconspicuous graphical modulations that encode information embedded in an original base image) are described. The graphical bar code may be graphically demodulated automatically without foreknowledge of the original unmodulated base image, but rather based upon a base image that is derived based upon intrinsic features of the graphical bar code.

20 Claims, 7 Drawing Sheets

GRAPHICALLY DEMODULATING GRAPHICAL BAR CODES WITHOUT FOREKNOWLEDGE OF THE ORIGINAL UNMODULATED BASE IMAGE

CROSS-REFERENCE TO RELATED APPLICATIONS

This application relates to the following applications, each of which is incorporated herein by reference: U.S. patent application Ser. No. 09/579,070, filed May 25, 2000, by Doron Shaked et al., and entitled "A Method and Apparatus for Generating and Decoding a Visually Significant Bar Code;" U.S. patent application Ser. No. 09/429,515, filed Oct. 28, 1999 by Renato Kresch et al., and entitled "System and Method for Counterfeit Protection;" U.S. Ser. No. 09/728,292, filed Dec. 1, 2000, by Jonathan Yen et al., and entitled "Authenticable Graphical Bar Codes;" U.S. patent application Ser. No. 09/578,843, filed May 25, 2000, by Doron Shaked et al., and entitled "Geometric Deformation Correction Method and System for Dot Pattern Images;" U.S. Ser. No. 09/877,516, filed on Jun. 7, 2001, by Doron Shaked et al., and entitled "Generating and Decoding Graphical Bar Codes;" U.S. patent application Ser. No. 09/877,581, filed on Jun. 7, 2001, by Jonathan Yen et al., and entitled "Automatically Extracting Graphical Bar Codes;" and U.S. patent application Ser. No. 09/877,517, filed on Jun. 7, 2001, by Doron Shaked et al., and entitled "Fiducial Mark Patterns for Graphical Bar Codes."

TECHNICAL FIELD

This invention relates to systems and methods of graphically demodulating graphical bar codes.

BACKGROUND

A typical bar code symbol is a pattern of parallel bars and spaces of various widths that represent data elements or characters. The bars represent strings of binary ones and the spaces represent strings of binary zeros. A conventional "one-dimensional" bar code symbol contains a series of bars and spaces that vary only in a single dimension. One-dimensional bar code symbols have relatively small information storage capacities. "Two-dimensional" bar codes have been developed to meet the increasing need for machine-readable symbols that contain more information than one-dimensional bar code symbols. The information storage capacity of two-dimensional bar code symbols is increased relative to one-dimensional bar codes by varying the bar code patterns in two dimensions. Common two-dimensional bar code standards include PDF417, Code 1, and Maxicode. One-dimensional and two-dimensional bar code symbols typically are read by optical scanning techniques (e.g., by mechanically scanned laser beams or by self-scanning charge-coupled devices (CCD's)) that convert a printed bar code symbol into electrical signals. The electrical signals are digitized and decoded to recover the data encoded in the printed bar code symbol.

Bar codes may be used in a variety of applications, including low information content applications (e.g., automatic price tagging and inventory management), and relatively high information content applications (e.g., encoding mail addresses and postage for automated mail reading and mail distribution systems, and encoding compressed content of a printed page).

SUMMARY

As used herein, the term "graphical bar code" broadly refers to an image that contains inconspicuous graphical modulations that encode embedded information. The invention features systems and methods of graphically demodulating a graphical bar code automatically without foreknowledge of the original unmodulated base image, but rather based upon a base image that is derived based upon intrinsic features of the graphical bar code.

In one aspect, the invention features a method of decoding a graphical bar code corresponding to an original base image that is modulated with a graphical encoding of an original message. In accordance with this inventive method, one or more intrinsic features of the graphical bar code are measured. Based upon the intrinsic feature measurements, a sequence of graphical templates is selected from a predefined template set of information-encoding graphical templates. The graphical bar code is graphically demodulated with selected sequence of graphical templates to produce a message.

Embodiments in accordance with this aspect of the invention may include one or more of the following features.

The step of selecting the sequence of graphical templates preferably comprises deriving a base image corresponding to the original image based upon the intrinsic feature measurements.

In some embodiments, the step of selecting the sequence of graphical templates comprises selecting a template for each region of the graphical bar code likely to match a corresponding region of the original base image. A weighted average of gray value measurements may be computed over each graphical bar code region. The weighted average of gray values may be computed by fitting a mask to dot locations over the given graphical bar code region. The mask may have a truncated Gaussian profile.

In some of these embodiments, the step of selecting a template for each region of the graphical bar code comprises computing template probabilities for each graphical bar code region. Template probabilities may be computed for a given bar code region based upon the weighted average of gray value measurements over each graphical bar code region. In some of these embodiments, parameters of probability distributions fit to a histogram of the weighted average gray values may be estimated.

In other embodiments, the step of selecting a template for each region of the graphical bar code comprises assigning a dark pixel value or a bright pixel value to each pixel based upon a threshold that is applied to the masked average gray value measurements.

In some embodiments, the step of selecting the sequence of graphical templates comprises selecting a base image that is likely to match the original base image from a set of possible base images. The matching base image may be selected based upon information that is encoded in the graphical bar code. For example, the matching base image may be selected based upon size and aspect ratio characteristics of the graphical bar code. The matching base image may be selected based upon correlation between the graphical bar code and base images of the set of possible base images. The matching base image also may be selected based upon a message that is associated with the graphical bar code. The message may be embedded in a bar code located in a predefined position relative to the graphical bar code, in a marking pattern surrounding the graphical bar code, or in a marking pattern having a different radiant energy response than the graphical bar code.

In another aspect, the invention features a computer program for decoding a graphical bar code corresponding to an original base image that is modulated with a graphical encoding of an original message. The computer program resides on a computer-readable medium and comprises computer-readable instructions for causing a computer to: measure one or more intrinsic features of the graphical bar code; based upon the intrinsic feature measurements, select a sequence of graphical templates from a predefined template set of information-encoding graphical templates; and graphically demodulate the graphical bar code with the derived sequence of graphical templates to produce a message.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
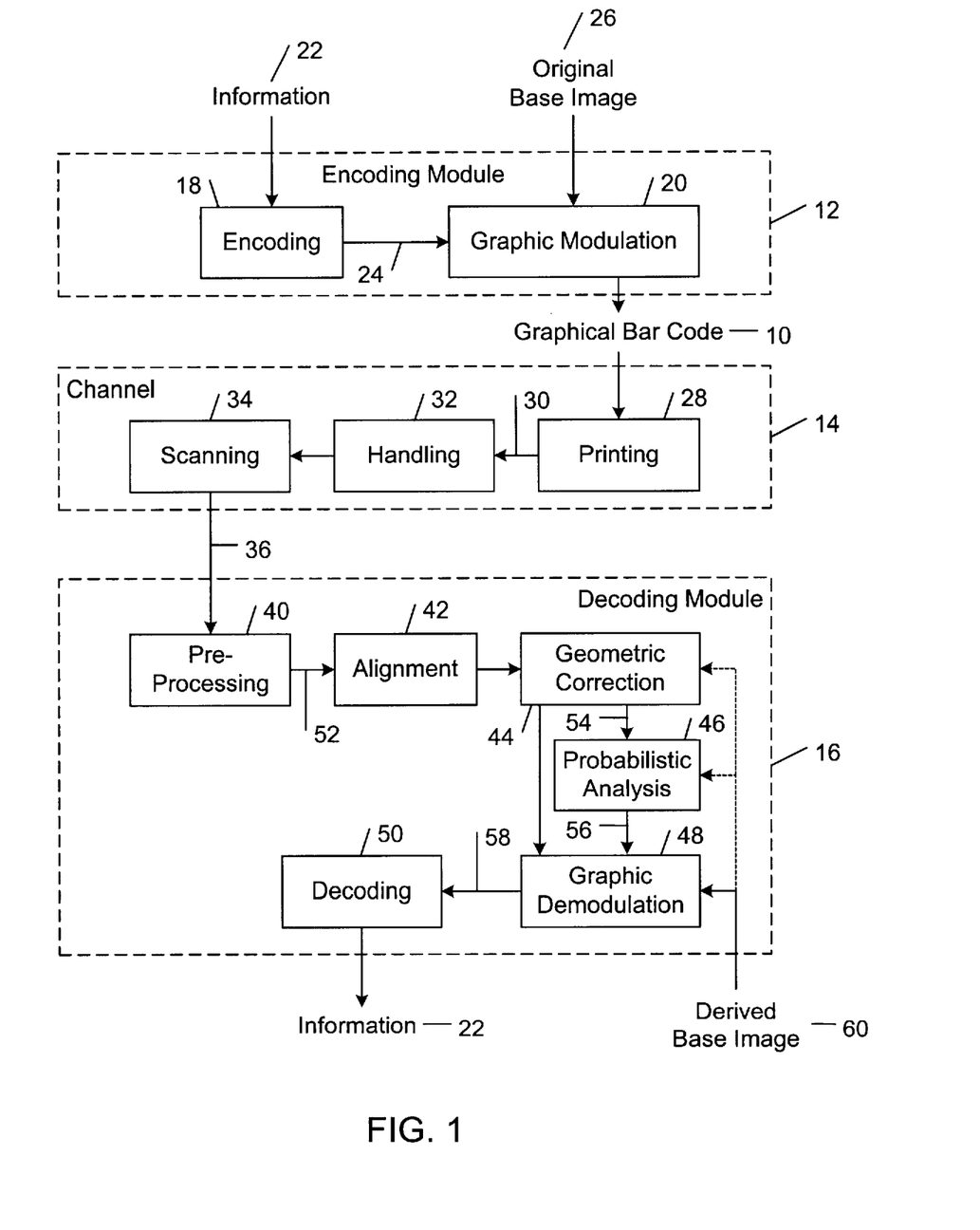
FIG. 1 is a block diagram of an encoding module, a decoding module, and document-handling channel through which one or more graphical bar codes may be transmitted.

Referring to FIG. 1, in one embodiment, a graphical bar code 10 may be generated by an encoding module 12, processed through a document-handling channel 14, and decoded by a decoding module 16.

Encoding module 12 includes an encoding stage 18 and a graphic modulation stage 20. Encoding module 12 may be implemented as one or more program modules that are executable on a computer or other programmable processor.

In operation, encoding module 12 encodes information 22 into an encoded message 24. For example, information 22 may be compressed in accordance with a conventional compression algorithm, and encoded with an error correction code. Error correction coding provides robustness to errors due to degradations introduced by document-handling channel 14. The error correction codes also may be interleaved to protect against burst errors. In some embodiments, encoding module 12 may be programmed to generate from information 22 a corroborative signed message in accordance with the encoding process described in U.S. Ser. No. 09/728,292, filed Dec. 1, 2000, by Jonathan Yen et al., and entitled "Authenticable Graphical Bar Codes." During the encoding stage 18, the compressed and error correction coded message is translated into an ordered sequence of information-encoding graphical templates. During the graphic modulation stage 20, an original base image 26 is modulated in accordance with the ordered sequence of graphical templates to produce graphical bar code 10. Base image 26 may be any graphical pattern, including a logo (e.g., a company logo), graphics, pictures, text, images, or any pattern that has visual significance. Information 22 may be embedded in the graphical design of text, pictures, images, borders, or the background of base image 26 to produce graphical bar code 10. Information 22 may be embedded in graphical bar code 10 in the form of a binary image (e.g., a dark and bright dot pattern), a multilevel image (e.g., a gray-level image), or a multilevel color image.

In the document-handling channel 14, graphical bar code 10 may be converted into one or more hard copies 30 by a printing stage 28. Hard copies 30 may be processed through a handling stage 32 before being converted into an electronic scanned image 36 by a scanning stage 34. Graphical bar code 10 may be printed by a conventional printer (e.g., a LaserJet® printer available from Hewlett-Packard Company of Palo Alto, Calif., U.S.A.) or a special-purpose label printing device. Hard copies 30 may be in the form of any one of a wide variety of printed materials, including a bank draft (or check) carrying a graphical bar code of a withdrawal authorization signature, a stock certificate or bond carrying a graphical bar code of an authenticity certification, and an envelope carrying a graphical bar code of postage indicia. Hard copies 30 may be scanned by a conventional desktop optical scanner (e.g., a ScanJet® scanner available from Hewlett-Packard Company of Palo Alto, Calif., U.S.A.) or a portable scanner (e.g., a CapShare® portable scanner available from Hewlett-Packard Company of Palo Alto, Calif., U.S.A.). The scanned image 36 that is acquired by the scanner and introduced into decoding module 16 is a degraded version of the original graphical bar code 10. These degradations may be generated at one or more of the document-handling channel stages, including the printing stage 28, the handling stage 32 (e.g., copying degradations, stains, folds, staples, and markings), and the scanning stage 34.

In general, decoding module 16 includes a pre-processing stage 40, an alignment stage 42, a geometric correction stage 44, an optional probabilistic analysis stage 46, a graphic demodulation stage 48, and a decoding stage 50. Decoding module 16 may be implemented as one or more program modules that are executable on a computer or other programmable processor. During the pre-processing stage 40, a scanned graphical bar code image 52 may be located in scanned image 36, and non-bar code regions may be cropped and trimmed from the scanned (or input) image 36. See U.S. patent application Ser. No. 09/877,581, filed on Jun. 7, 2001, by Jonathan Yen et al., and entitled "Automatically Extracting Graphical Bar Codes." During the alignment stage 42, fiducial marks are detected in scanned bar code image 52. The configuration of the detected fiducial marks indicates the type of global deformations that might have been introduced into the graphical bar code during transmission of graphical bar code 10 through document handling channel 14. These global deformations (e.g., translational, rotational, affine and skew distortions) may be corrected during the geometric correction stage 44 as described in U.S. patent application Ser. No. 09/578,843, filed May 25, 2000, by Doron Shaked et al., and entitled "Geometric Deformation Correction Method and System for Dot Pattern Images." During the probabilistic analysis stage 46, in one embodiment, probability models are applied to pixel value measurements obtained from the aligned and geometrically corrected scanned bar code image 54 to produce a set of probability parameters 56. The probability parameters 56 are used during the graphic demodulation stage 48 to select the most likely sequence of information-encoding graphical templates that corresponds to the graphical template sequence that was originally encoded into base image 26. See U.S. Ser. No. 09/877,516, filed on Jun. 7, 2001, by Doron Shaked et al., and entitled "Generating and Decoding Graphical Bar Codes." The selected graphical template sequence is translated into an encoded message 58 that is decoded into information 22 by the decoding stage 50. As explained in detail below, decoding module 16 is configured to decode scanned graphical bar code 36 automatically without foreknowledge of the original, unmodulated base image 26, but rather based upon a derived base image 60.

Figure 2:
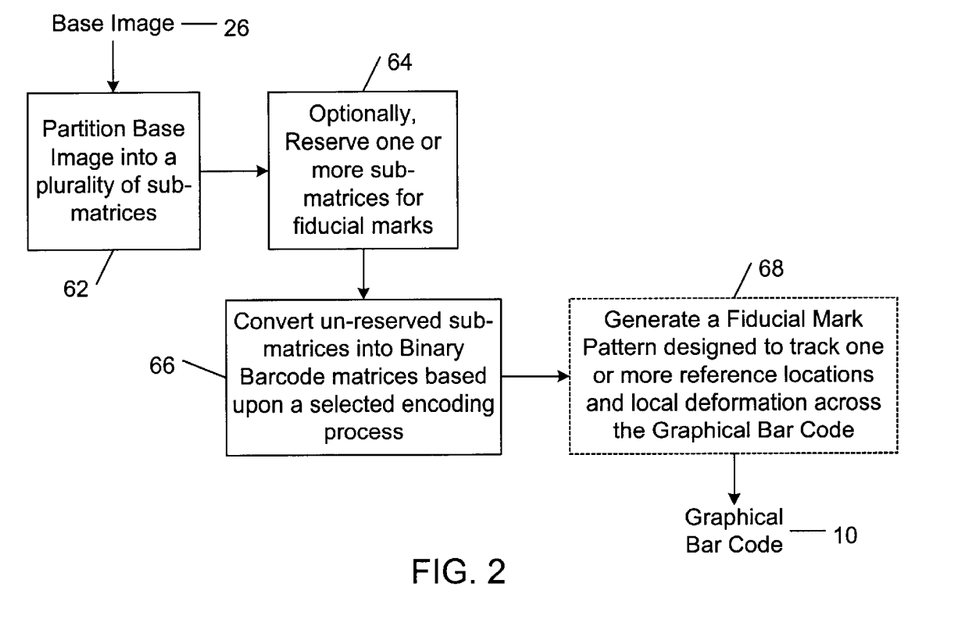
FIG. 2 is a flow diagram of a method of rendering a base image with a graphical encoding of information.
Figure 10:
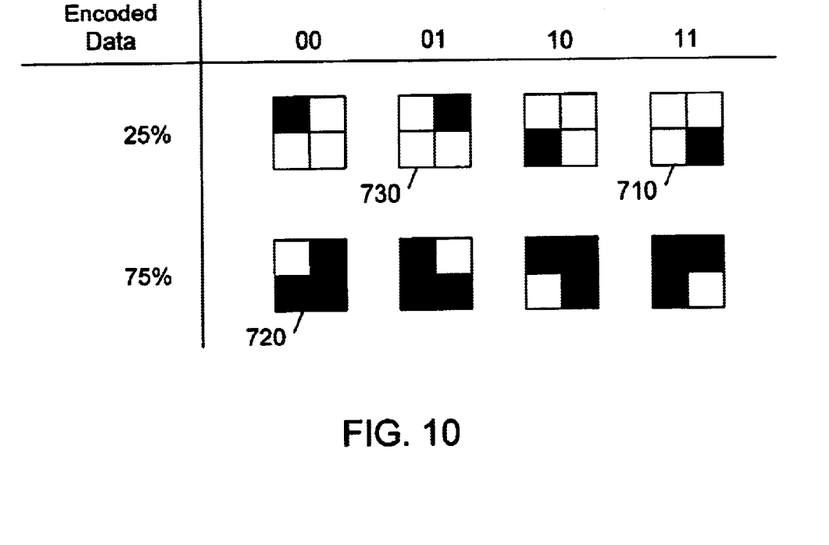
FIG. 10 shows pattern matrices (or templates) of a bi-level graphical encoding embodiment.
Figure 11A:
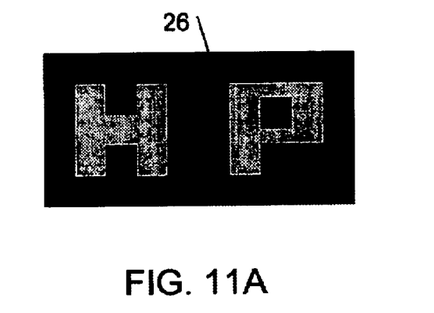
FIG. 11A illustrates an exemplary base image.
Figure 11B:
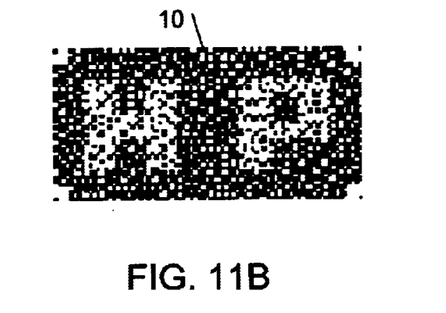
FIG. 11B illustrates an exemplary graphical bar code corresponding to the exemplary base image of FIG. 11 graphically encoded in accordance with the bi-level graphical encoding embodiment of FIG. 10.

Referring to FIG. 2, graphical bar code 10 may be produced by graphically modulating base image 26 in accordance with the following graphical encoding process. Base image 26 is partitioned into a plurality of sub-matrices (or sub-images) (step 62). For example, if base image 26 is an M×N pixel image, it may be partitioned into a regular array of O K×K pixel sub-matrices, where O M×N/(K×K). Optionally, one or more base image sub-matrices may be reserved for fiducial marks (step 64). Un-reserved sub-matrices are converted into binary bar code matrices based upon a selected graphical encoding process (step 66). For example, referring to FIGS. 10, 11A, and 11B, in one graphical encoding embodiment, information 22 may be encoded into a bi-level image by a two-bit encoding process based upon two-by-two halftone patterns (or matrices). In this graphical encoding embodiment, for those pixels in the logo base image 26 of FIG. 11A that have a 25% gray level, one of the four bar code matrices in the first row of FIG. 10 is used to render graphical bar code 10 based on the information 22 to be encoded. For example, if the data to be encoded for a pixel is "11", the pixel is rendered by utilizing the bar code matrix 710. Similarly, of the data to be encoded for a pixel is "01", the pixel is rendered by utilizing the bar code matrix 730. Similarly, for those pixels in the logo base image 26 that have a 75% gray level, one of the four bar code matrices in the second row of FIG. 10 is used to render graphical bar code based on the information 22 to be encoded. For example, if the data to be encoded for a pixel is "00", the pixel is rendered by utilizing the bar code matrix 720. For more information relating to the bi-level graphical encoding approach of FIG. 10, see U.S. patent application Ser. No. 09/579,070, filed May 25, 2000, by Doron Shaked et al., and entitled "A Method and Apparatus for Generating and Decoding a Visually Significant Bar Code." In another graphical encoding embodiment, un-reserved sub-matrices may be converted into binary bar code matrices by applying an invertible graphical operation (e.g., an XOR graphical operation) between the un-reserved sub-matrices and a sequence of information-encoding graphical templates that is ordered in accordance with the information 22 to be encoded. See U.S. patent application Ser. No. 09/877,516, filed on Jun. 7, 2001, by Doron Shaked et al., and entitled "Generating and Decoding Graphical Bar Codes." A fiducial mark pattern also may be generated to track one or more reference locations and local deformation across the resulting graphical bar code (step 68). See U.S. patent application Ser. No. 09/877,517, filed on June 7, 2001, by Doron Shaked et al., and entitled "Fiducial Mark Patterns for Graphical Bar Codes."

Figure 3:
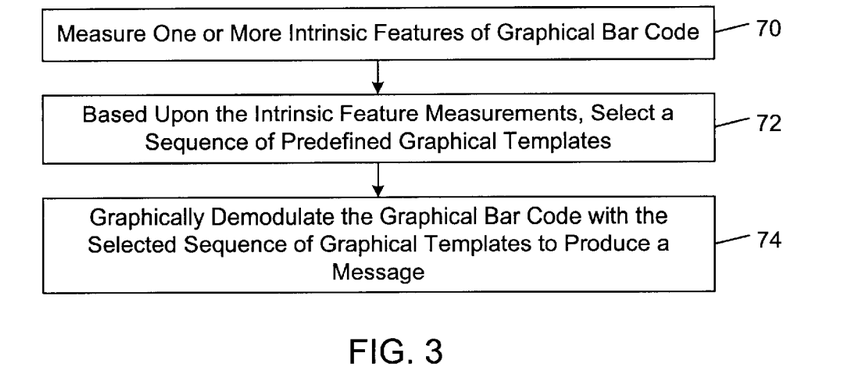
FIG. 3 is a flow diagram of a method of graphically demodulating a graphical bar code without foreknowledge of the original unmodulated base image.

Referring to FIG. 3, in one embodiment, decoding module 16 is configured to graphically demodulate scanned graphical bar code 36 automatically without foreknowledge of the original unmodulated base image 26, but rather based upon a base image 60 that is derived from intrinsic features of scanned graphical bar code 36. In accordance with this graphical demodulation method, one or more intrinsic features of scanned graphical bar code 36 are measured (step 70). The intrinsic features may correspond to pixel values of scanned graphical bar code 36. Alternatively, the intrinsic features may correspond to encoded information that is associated with scanned graphical bar code 36 and from which a base image of a predefined set of possible base images may be selected. Based upon the intrinsic feature measurements, a sequence of predefined graphical templates is selected (step 72). The graphical bar code is demodulated with the selected sequence of graphical templates to produce a message (step 74). The message then may be decoded to recover information 22.

In general, each scanned sub-image may be compared against all of the halftones that an arbitrary input sub-image may have created. After the best match is found, the halftone information is available for the demodulation process. For example, if a sub-image holds n pixels, there are $2^n$ different sub-images. Assuming each different sub-image may give rise to L distinct halftone patterns, there are $L2^n$ possible bar code templates to compare. For the $L2^n$ output sub-images to be distinct, there should be more halftone dots than input pixels. Specifically, if there are m dots in every halftone pattern, this condition requires that $2^m > L2^n$, or $m > \log_2 L + n$. Both the base image input region (one of $2^n$) and the information-encoding graphical template (one of L) may be derived from the best match between the input sub-image and the $L2^n$ halftones.

Figure 4:
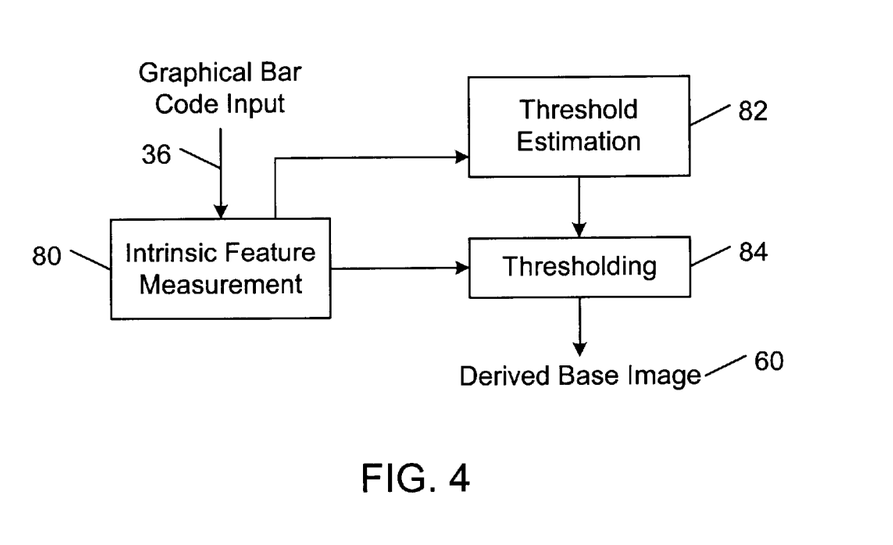
FIG. 4 is a diagrammatic view of a process of deriving a base image from a graphical bar code.

Referring to FIG. 4, in some embodiments, the process of identifying the best match between the input sub-image and the $L2^n$ halftones is separated into the steps of estimating the most likely base image region, and identifying the corresponding graphical template by graphically demodulating the graphical bar code input region with the estimated (or derived) base image region. A base image may be derived from scanned bar code image 36 (or graphical bar code input) by selecting templates for each region (or sub-image) of the graphical bar code input likely to match a corresponding region of the original base image 26. In accordance with this embodiment, intrinsic features of the graphical bar code input 36 are measured (step 80). Based upon the intrinsic feature measurements, a threshold is estimated (step 82). The estimated threshold then is applied to the intrinsic feature measurements to derive the base image 60 (step 84).

Figure 5:
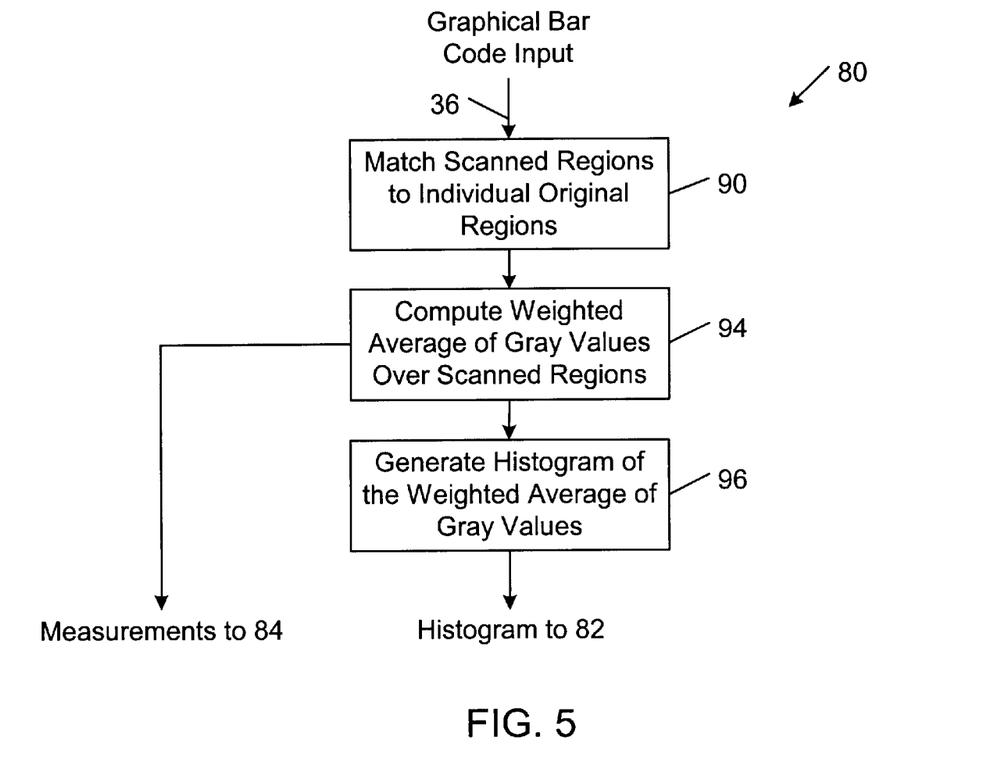
FIG. 5 is a flow diagram of a method of computing a histogram of weighted average of gray values of graphical bar code input regions that are correlated with a mask.
Figure 6:
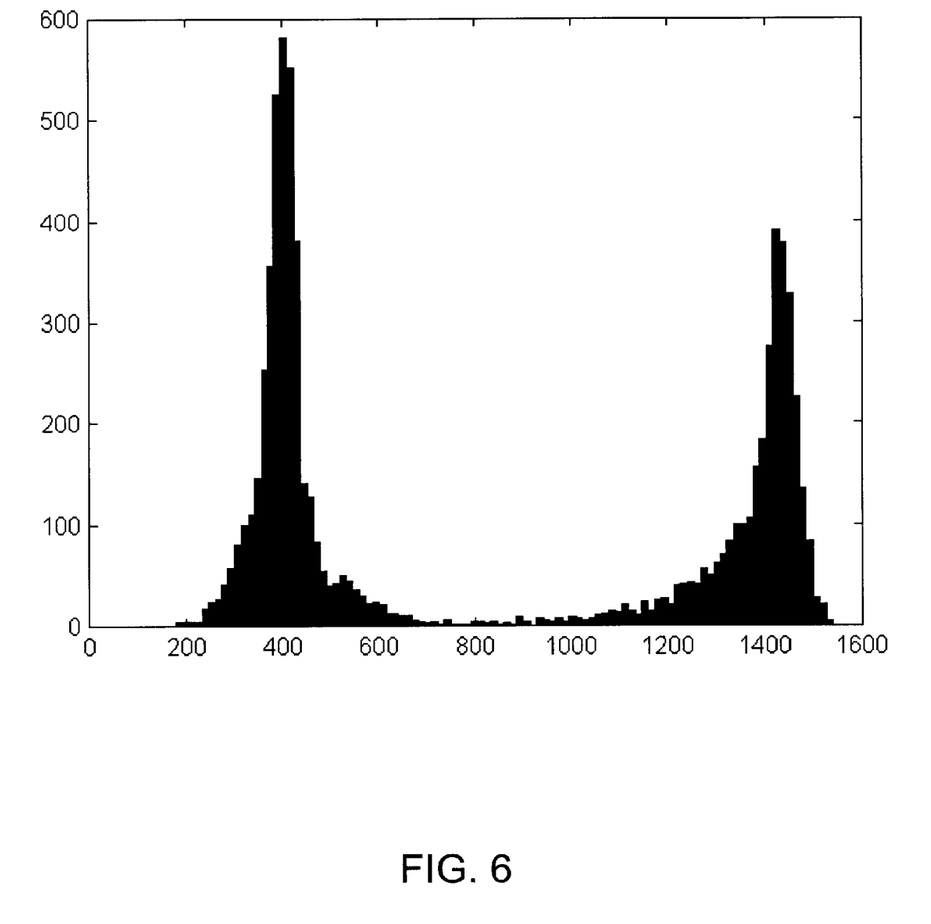
FIG. 6 is an example of a histogram that is computed in the method of FIG. 5.
Figure 7:
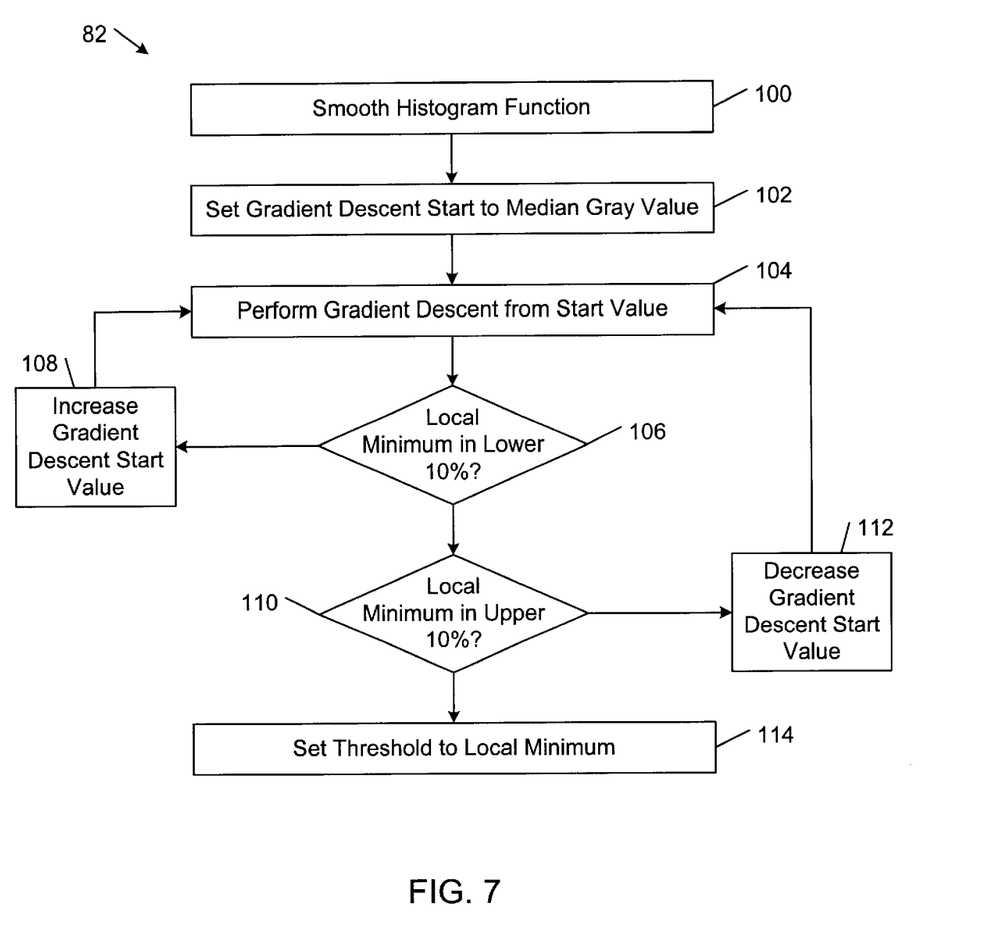
FIG. 7 is a flow diagram of a method of computing a threshold value that is used to select pixel values for estimating the original unmodulated base image.

Referring to FIGS. 5, 6 and 7, in one embodiment, graphical bar code 10 may be decoded in accordance with the process of FIG. 4, as follows.

Referring initially to FIG. 5, pixel arrays in the scanned and aligned bar code image are identified to individual pixels in the original bar code image 10 (step 90). Typically, the graphical bar code is scanned at a high resolution such that each original pixel corresponds to an array of r×r scanned pixels. Due to the visual degradation that often is caused by the printing, handling and scanning processes of document-handling channel 14, the resulting arrays of scanned pixels are no longer homogenous and, instead, contain scanned pixels of different gray levels. Under these conditions, the borders of the scanned pixels arrays corresponding to each pixel in the original graphical bar code 10 are identified in accordance with the method described in U.S. patent application Ser. No. 09/578,843, filed May 25, 2000, by Doron Shaked et al., and entitled "Geometric Deformation Correction Method and System for Dot Pattern Images."

As explained in detail below, each r×r dot array in scanned bar code image 36 is identified with a single original graphical bar code pixel. For example, if the encoding process is based upon a set of 2×2 graphical templates, each 2×2 dot array in the scanned bar code image 36 is identified with a single pixel of the original bar code image. Next, the input pixel is estimated by measuring the average gray value of the corresponding r×r dot pattern. The average gray value may be measured by correlating the arrays with a mask. In the following description, s is defined as an array of scanned pixels corresponding to one original pixel and the gray levels of its scanned pixels are denoted by $s_{i,j}$ where i, j=1, ..., r.

Referring to FIGS. 5 and 6, in one embodiment, a weighted average of gray values is computed for each pixel of each measurement block (step 94). To that end, a function of the $s_{i,j}$ that discriminates between arrays that corresponds to dark original pixels and those corresponding to bright original pixels is applied to the scanned pixel arrays. In one embodiment, the linear discrimination function of equation (1) is applied to the scanned pixel arrays to discriminate between dark and bright pixels.

$$f(s) = \sum_{i,j=1,r} c_{i,j} s_{i,j} \quad (1)$$

where the coefficients $c_{i,j}$ are taken as grid values of the two dimensional truncated gaussain shaped surface of equation (2).

$$\text{pos}(\exp(-(x-c)^2/s)-\Delta) \quad (2)$$

where x indicates the mask coordinate, c the center of the dot pattern, Δ the truncation factor, s a scalar factor, and pos (x)=x for x>0 and 0 for x≦0. The scalars s and Δ are tuned according to the scanning resolution and the expected deformation strength. In one embodiment, s and Δ are set so that the mask is 0 along a band whose width is about ⅓ dot size, and rises to half its amplitude at about ⅓ dot size away from the center.

The measurements are collected, and analyzed to find a threshold indicating whether the original pixel corresponding to a measured pattern is dark or bright. To this end, a histogram (see FIG. 6) of the discrimination function is computed for each pixel in the scanned halftoned image (step 96). The histogram measurements are a weighted average of gray values of aligned and geometrically corrected dot locations over a given image. The horizontal axis is a linear function of the weighted average of gray values, and the vertical axis is the histogram count axis. The right side population belongs to "bright" pixels and the left side population belongs to "dark" pixels.

Referring to FIG. 7, in one embodiment, a threshold for identifying bright and dark pixels is estimated as follows. First, the histogram function is smoothed using, for example, a conventional smoothing algorithm (e.g., an algorithm based upon convolution with a Gaussian function) (step 100). Next, a gradient descent start value is set initially to the median gray value (step 102). A gradient descent is performed from the start value (step 104). If the resulting local minimum is located in the lower $10^{th}$ percentile of the distribution of dots (step 106), the gradient descent start value is increased (step 108) and the process is repeated (step 104). Similarly, if the resulting local minimum is located in the upper $10^{th}$ percentile of the distribution of dots (step 110), the gradient descent start value is decreased (step 112) and the process is repeated (step 104). Otherwise, the estimated threshold is set to the local minimum gray value (step 114).

The estimated base image 60 is derived by applying the estimated threshold to the histogram (step 84; FIG. 4). The derived base image 60 then may be used to graphically demodulate the graphical bar code input (step 48; FIG. 1). For example, each of the templates of a known set of graphical templates may be applied to the derived base image 60 to generate a set of L possible halftone patterns. Each of the set of L possible halftone patterns then may be compared with the sub-image regions of the input scanned bar code image 36 to determine the most likely sequence of graphical templates. The most likely matching graphical templates may be selected using the matched filter approach described in U.S. patent application Ser. No. 09/579,070, filed May 25, 2000, by Doron Shaked et al., and entitled "A Method and Apparatus for Generating and Decoding a Visually Significant Bar Code." Alternatively, the most likely matching graphical templates may be selected using the maximum likelihood approach described in U.S. Ser. No. 09/877,516, filed on Jun. 7, 2001, by Doron Shaked et al., and entitled "Generating and Decoding Graphical Bar Codes." The template sequence then is translated into a corresponding symbol sequence based upon the coding process used to encode information 22 into graphical bar code 10.

Figure 8:
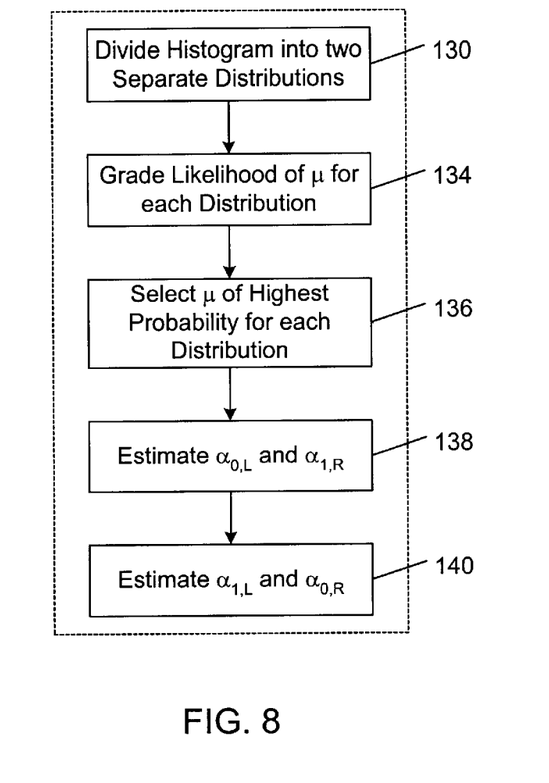
FIG. 8 is a flow diagram of method of estimating parameters of a pair of probability distribution functions fit to the histogram of FIG. 6.

Referring to FIG. 8, in another embodiment, derived base image 60 may be decoded probabilistically by estimating probability density function parameters, and determining the pixel value probability (i.e., the probability of being a dark pixel or a bright pixel) for each pixel. Based on the shape of such histograms, the distribution of f(s) may be modeled by bi-modal non-symmetric exponential distributions. For example, in one embodiment, dark (bright) pixels y=f(s) may be assumed to be distributed in accordance with the asymmetric Laplacian distributions of equation (3).

$$P(y \mid \alpha_L, \alpha_R, \mu) = \begin{cases} \alpha_L \exp\{-\alpha_L(\mu - y)\} & y < \mu \\ \alpha_R \exp\{-\alpha_R(y - \mu)\} & y > \mu \end{cases} \quad (3)$$

Figure 9:
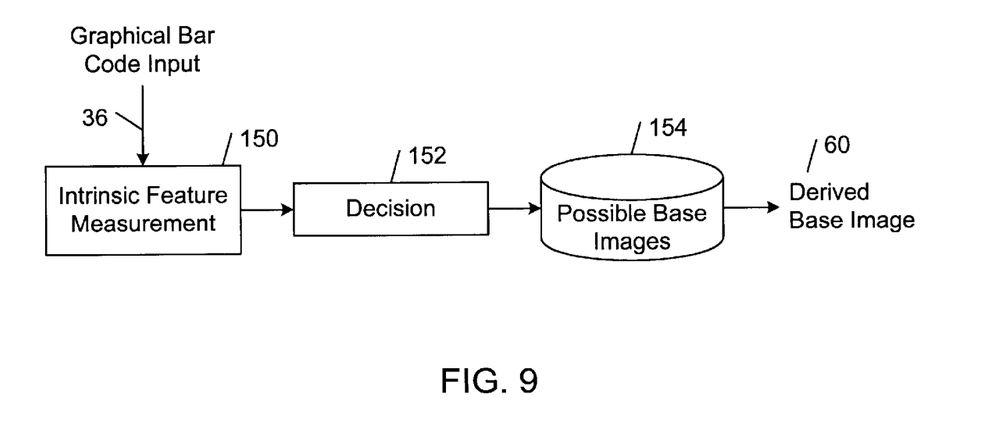
FIG. 9 is a flow diagram of a method of deriving a base image by selecting a predefined base image that is most likely to match the original unmodulated base image based upon information encoded in the graphical bar code input.

The parameters of the distribution functions may be estimated as follows. Since the parameters $\alpha_L$, $\alpha_R$ and $\mu$ are different for the dark pixel population and the bright pixel population, the overall number of parameters to be estimated in this probabilistic approach is six. To simplify the notations in the following description, dark pixels are denoted by 0 and bright pixels are denoted by 1, and the parameters are indexed accordingly. As shown in FIG. 9, in order to reduce the computational burden, the parameter estimation process is divided into two steps: (1) estimating $\mu_0, \mu_1, \alpha_{0L}$ and $\alpha_{1R}$; and (2) estimating $\alpha_{1L}$ and $\alpha_{0R}$.

Initially, the observations $y_i = f(g_i)$ are partitioned into two populations based upon the known or expected numbers of "dark" pixels ($N_0$) and "bright" pixels ($N_1$) (step 130). The "dark" population includes the smallest $N_0$ observations and the "bright" populations includes the rest (largest $N_1$). For each of these populations the mode ($\mu$) is estimated by the following maximum likelihood approximated method (step 134). The value of $\mu$ (for the sake of simplicity we ignore the 0/1 subscript) that maximizes the maximum likelihood estimator for $\mu$ is computed from equation (4) (step 136).

$$\overline{\mu} = \underset{\mu}{\operatorname{Argmax}}\left\{\frac{1}{|N_L|} \cdot \sum_{i \in I_L}(\mu - y_i) + \frac{1}{|N_R|} \cdot \sum_{i \in I_R}(y_i - \mu)\right\} \quad (4)$$

where $I_L$ is the set of observations smaller than $\mu$, $I_R$ the set of observations larger than $\mu$, $N_L = |I_L|$ and $N_R = |I_R|$. (Note that $I_L$ and $I_R$—and hence $N_L$ and $N_R$—are functions of $\mu$.)

The parameters $\alpha_{0L}$ and $\alpha_{1R}$ are estimated for the best corresponding $\mu$ by equations (5) and (6) (step 138).

$$1/\alpha_{0L} = (1/N_{0L})\sum_{i \in I_{0L}} \mu_0 - y_i \quad (5)$$

$$1/\alpha_{1R} = (1/N_{1R})\sum_{i \in I_{1R}} y_i - \mu_1 \quad (6)$$

where $I_{0L}$ is the set of observations smaller than $\mu_0$, $I_{1R}$ the set of observations larger than $\mu_1$, $N_{0L} = |I_{0L}|$ and $N_{1R} = |I_{1R}|$.

After $\mu_0$, $\mu_1$, $\alpha_{0L}$ and $\alpha_{1R}$ have been estimated, the parameters $\alpha_{1L}$ and $\alpha_{0R}$ may be estimated (step 140). (Hereinafter, the notations $\alpha_1$ and $\alpha_0$ are used for $\alpha_{1L}$ and $\alpha_{0R}$, respectively.) All observations below $\mu_0$ and above $\mu_1$ are ignored and $I_M$ and $N_M$ are defined as $I_M = \{y|\mu_0 \leq y \leq \mu_1\}$ and $N_M = |I_M|$. The observations $\{y_i : i \in I_M\}$ are are to be samples from a random vector with the following distribution:

$$P(y_i, x_i) = \prod_{i \in I_M} P_{x_i} \alpha_{x_i} \exp\{-\alpha_{x_i}|y_i - \mu_{x_i}|\} \quad (7)$$

where $x_i$ takes the values 0 or 1 with the probabilities $P_0$ and $P_1$, respectively. The EM paradigm is used to estimate $\alpha_1$ and $\alpha_0$. The EM algorithm begins with initial values for the parameters and perform a series of updating stages that converge to a (local) maximum of the mean maximum likelihood objective function.

To estimate the values of $\alpha_1$ and $\alpha_0$ the conditional expectation of equation (8) is maximized at each stage of the algorithm.

$$E[\log P(y_i, x_i) | \alpha_0, \alpha_1, y_i] = \quad (8)$$
$$\sum_{i \in I_M} P(0 | \alpha_0, \alpha_1, y_i)[\log(P_0 \alpha_0) - \alpha_0(y_i - \mu_0)] +$$
$$P(1 | \alpha_0, \alpha_1, y_1)[\log(P_1 \alpha_1) - \alpha_1(y_i - \mu_1)]$$

The estimation for $\alpha_{1L}$ and $\alpha_{1R}$ are the values of the estimates for $\alpha_1$ and $\alpha_0$ at the last updating stage. The EM algorithm includes an initialization step and an updating step.

Referring to FIG. 9, in one embodiment, the sequence of predefined graphical templates may be selected based upon measured intrinsic features corresponding to encoded information that is associated with scanned graphical bar code 36. The graphical bar code input 36 initially is measured (step 150). Next, a base image index value corresponding to the identified base image is selected (step 152). Finally, a derived base image 60 is extracted from a set of possible base images (step 154). The derived base image 60 may then be used to graphically demodulate the scanned bar code image 36, as described above. The derived base image 60 also may be used during the geometric correction process 44 or the probabilistic analysis process 46, or both (see FIG. 1).

In general, the base image identification information is coded (implicitly or explicitly) in the graphical bar code 10 in such a way that it is possible to extract the information without foreknowledge of the base image. In some embodiments, the identification information is encoded in the size and aspect ratio of bar code image 10. In other embodiments, the base image may be identified by correlating the graphical bar code input 36 with each of the set of possible base images. The base image from the set of possible base images with the highest correlation with the input image is selected as the derived base image 60. Thus, high correlation of the input graphical bar code image with a base image is an implicit indicator. In other embodiments, the base image index value may be coded as a conventional one-dimensional or two-dimensional bar code or a graphical bar code. For example, the base image index value may be coded in a designated area of graphical bar code 10 (e.g., in the first couple of dot lines). The base image index value also may be coded in an area near graphical bar code 10. Alternatively, the base image index value may be coded in markings (e.g., simulated perforation marks) surrounding graphical bar code 10. In other embodiments, the base image index value may be embedded in a marking pattern having a different radiant energy response from the graphical bar code. For example, the base image index value may be encoded using an ink (e.g., ultraviolet ink) that appears only under certain lighting conditions, or that responds to a visible light color channel (e.g., chrominance) that is different from the visible light color channel response of graphical bar code 10.

Some embodiments may incorporate one or more of the above-described base image index encoding methods. In embodiments incorporating multiple encoding methods, the results of multiple corresponding intrinsic feature measurements may be forwarded to the decision block (step 152) for use in identifying the most likely matching base image.

The systems and methods described herein are not limited to any particular hardware or software configuration, but rather they may be implemented in any computing or processing environment, including in digital electronic circuitry or in computer hardware, firmware or software. The encoding and decoding modules may be implemented, in part, in a computer program product tangibly embodied in a machine-readable storage device for execution by a computer processor. In some embodiments, these modules preferably are implemented in a high level procedural or object oriented programming language; however, the algorithms may be implemented in assembly or machine language, if desired. In any case, the programming language may be a compiled or interpreted language. The encoding and decoding methods described herein may be performed by a computer processor executing instructions organized, e.g., into program modules to carry out these methods by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially-designed ASICs (application-specific integrated circuits).

Other embodiments are within the scope of the claims.

What is claimed is:

1. A method of decoding a graphical bar code corresponding to an original base image modulated with a graphical encoding of an original message, comprising:

measuring one or more intrinsic features of the graphical bar code;

based upon the intrinsic feature measurements, selecting a sequence of graphical templates from a predefined template set of information-encoding graphical templates; and graphically demodulating the graphical bar code with the selected sequence of graphical templates to produce a message.

2. The method of claim 1, wherein selecting the sequence of graphical templates comprises deriving a base image corresponding to the original image based upon the intrinsic feature measurements.

3. The method of claim 2, wherein selecting the sequence of graphical templates comprises selecting a template for each region of the graphical bar code likely to match a corresponding region of the original base image.

4. The method of claim 3, further comprising computing a weighted average of gray value measurements over each graphical bar code region.

5. The method of claim 4, wherein the weighted average of gray values is computed by fitting a mask to dot locations over each graphical bar code region.

6. The method of claim 5, wherein the mask has a truncated Gaussian profile.

7. The method of claim 5, wherein the step of selecting a template for each region of the graphical bar code comprises computing template probabilities for each graphical bar code region.

8. The method of claim 7, wherein template probabilities are computed for a given bar code region based upon the weighted average of gray value measurements over the given graphical bar code region.

9. The method of claim 7, further comprising estimating parameters of probability distributions fit to a histogram of the weighted average gray values.

10. The method of claim 5, further comprising assigning to each pixel a dark pixel value or a bright pixel value based upon a threshold applied to the masked average gray value measurements.

11. The method of claim 2, wherein selecting the sequence of graphical templates comprises selecting a base image likely to match the original base image from a set of possible base images.

12. The method of claim 11, wherein the matching base image is selected based upon information encoded in the graphical bar code.

13. The method of claim 12, wherein the matching base image is selected based upon size and aspect ratio characteristics of the graphical bar code.

14. The method of claim 12, wherein the matching base image is selected based upon correlation between the graphical bar code and base images of the set of possible base images.

15. The method of claim 12, wherein the matching base image is selected based upon a message associated with the graphical bar code.

16. The method of claim 15, wherein the message is embedded in a bar code located in a predefined position relative to the graphical bar code.

17. The method of claim 15, wherein the message is embedded in a marking pattern surrounding the graphical bar code.

18. The method of claim 15, wherein the message is embedded in a marking pattern having a different radiant energy response than the graphical bar code.

19. A computer program for decoding a graphical bar code corresponding to an original base image modulated with a graphical encoding of an original message, the computer program residing on a computer-readable medium and comprising computer-readable instructions for causing a computer to:

measure one or more intrinsic features of the graphical bar code;

based upon the intrinsic feature measurements, select a sequence of graphical templates from a predefined template set of information-encoding graphical templates; and graphically demodulate the graphical bar code with the selected sequence of graphical templates to produce a message.

20. The computer program of claim 19, wherein the sequence of graphical templates is selected by deriving a base image corresponding to the original image based upon the intrinsic feature measurements.

* * * * *